July 8, 1958 M. I. BRANT 2,842,007
BACKLASH ELIMINATING NUT MECHANISM
Filed June 26, 1957

Mertin I. Brant
INVENTOR.

BY *(signatures)*
Attorneys

United States Patent Office 2,842,007
Patented July 8, 1958

2,842,007

BACKLASH ELIMINATING NUT MECHANISM

Mertin I. Brant, Portland, Oreg.

Application June 26, 1957, Serial No. 668,130

5 Claims. (Cl. 74—441)

This invention provides a means of automatic backlash control, as between the driving screw, otherwise known as the feed or lead screw, and the screw driven platen or saddle of machine tools of various types. More particularly it is a mechanical arrangement, comprising two nuts and other component parts, forming a feed screw nut unit, that conforms automatically to such variations of the feed screw, as result from wear and/or irregularities in machining. This invention prevents backlash by automatically supplying a constant and even pressure, in a follow-up wedging manner, against the free side of the feed screw thread, in conjunction with the normal pressure exerted by the load, on the opposite or load side of said feed screw thread. In such manner this invention prevents the free movement of the platen or saddle, ahead of its prescribed timing.

Machine tools commonly in use have as a feed screw nut, a nut of conventional one piece type. Thus, no means is provided for either manual or automatic take-up of the backlash that accumulates from progressive wear. This backlash, being a factor over which the operator has no control, frequently permits the machine to hog into the work, with the resulting spoilage of said work and/or breakage of the machine.

To decrease this backlash, various types of manually adjusted nut arrangements are in use. These are not entirely satisfactory, however, for though adjustment may be made, decreasing the slack to a minimum on that portion of the feed screw having the least wear, said slack is still encountered on the portion of the feed screw receiving the greatest use, and consequently having the greatest wear, therefrom.

Previously, inventors have made attempts to perfect a workable backlash eliminating nut mechanism, of automatic nature. Among those on record, the ones most similar in design to this invention, have an arrangement and design of certain parts, that is in direct contrast to the principles employed in the engineering of this invention, and found to be essential, if a mechanically workable product of this nature is to result.

Previous designs employ as an abutment for a spring rotated take-up nut, either a flat surface perpendicular to the axis of the screw, or a helicodial surface, having its helical angle of the opposite hand as that of the screw thread. In these arrangements, as is the case with any nut and screw, an angle or V is formed by the juncture of the thread with the face of the nut. Noting, that at the end of entry, while the screw is rotating and passing through the nut, this V points in the direction of rotation; it becomes obvious that any wedge forced into this V will create an ever increasing binding of said parts, till friction exists to such extent that rotation ceases.

As indicated by the constructional details of these devices, it is presupposed that the spring activated take-up nut, acting as a wedge can be forced into this V, formed by the juncture of the load nut and the screw, without binding being the ultimate result.

In the engineering of the following described invention, a means was employed reversing this action. Instead of the torque of the screw and spring both being of such direction as to force the wedge into the V, only the spring is deployed in this manner, with the action of the screw being the reverse. In this arrangement a motivating balance is maintained between the frictional contact of the wedge against the screw and the reverse directional pressure of the spring.

This result is accomplished by forming the abutment for the take-up nut in such a manner and shape that the V points in the direction opposite that of the rotation of the screw. More particularly, the design of the abutment is such that it possesses a helical track of the same hand as the thread of the feed screw, but of a greater pitch, this track being the helical races of the recirculating type ball bearing units, as shown in the drawings.

In order for a machine tool to be of greatest value to industry, it must be so constructed, that once the platen or saddle is moved from its original setting, it can later be returned, by dial graduations, to that same setting, without error. In a machine employing a conventional nut such repeat performance is assured by its construction. The construction of this invention, by the established frictional difference between the inner and outer assemblies also assures repeat performance. As previously stated and shown in the drawings, an anti-friction ball bearing assembly is employed for the outer assembly. This friction free outer assembly, as opposed to the frictional resistance of the plane bearing surfaces of the inner assembly, permits and causes the outer assembly to work first, and continue to do so until its movement is further prevented by the stop. After the stop has been reached and the resistance thus reversed, the screw then begins to turn within the nuts, and continues to do so in a conventional manner.

It will be noted from the drawing that the rotation permitted between the stops is small, being only a fraction of a turn. The extent to which the inner assembly is permitted to turn as fixed by the stops, is dependent on the extent of wear variation of the screw. For a badly worn screw, the stops must be set farther apart to allow for a greater variation thereon, than would be necessary where little variation existed, however, a wide setting of the stops when in use with a screw having little variation, will in no way decrease the efficient operation of the mechanism.

The primary object of the present invention is to provide a backlash eliminating nut mechanism that automatically adjusts to conform to variations in the feed screw as a result from wear or irregularities therein.

Another object is to provide a backlash eliminating nut mechanism which supplies an even pressure in a follow-up wedging manner at all times on the normally free side of feed screw thread, thereby preventing the movement of the platen ahead of the prescribed timing thereof.

A further object is to provide a backlash eliminating mechanism wherein the difference in the lead of the thread of the ball race as compared with that of the nut together with the frictional difference between the surface bearing on the feed screw and the ball bearings contained in said race provides an automatic positive anti-backlash function.

A still further object is to provide an anti-backlash device simple in design, compact, inexpensive to manufacture and fully automatic.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1:
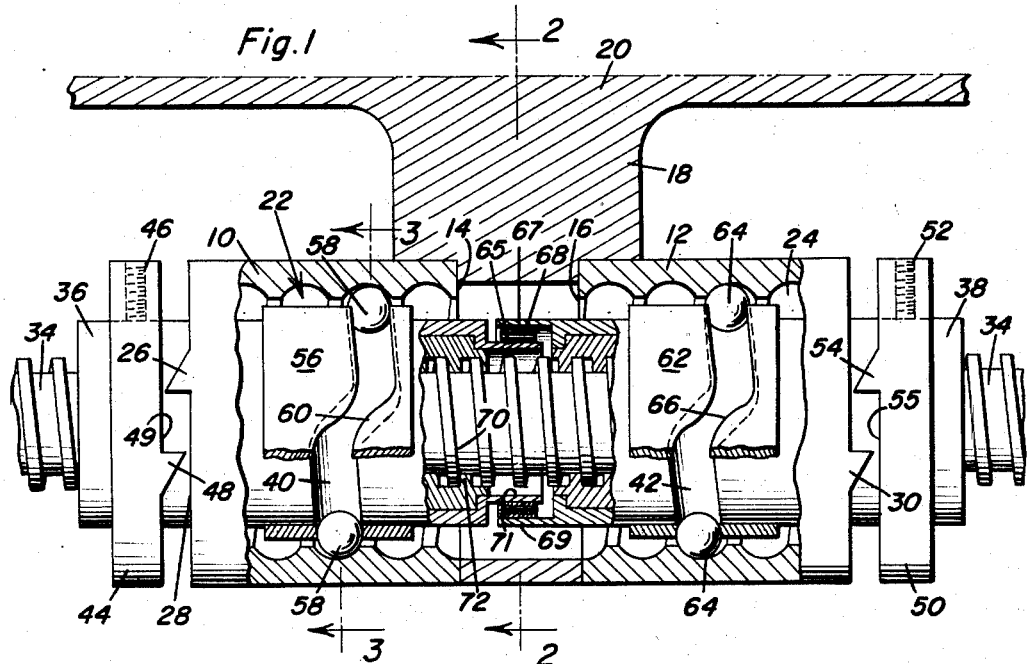
Figure 1 is an elevation partially in section with portions broken away to more clearly illustrate the novel feed screw nuts and spring arrangement of the present invention.
Figures 4, 5:
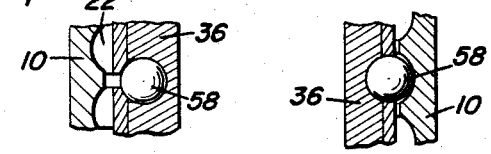
Figure 4 is an enlarged detail sectional view taken substantially along the lines 4—4 of Figure 3 showing the cross-over structure.
Figure 5 is an enlarged detail sectional view taken generally along line 5—5 of Figure 3 showing the details of the ball race.
Figure 2:
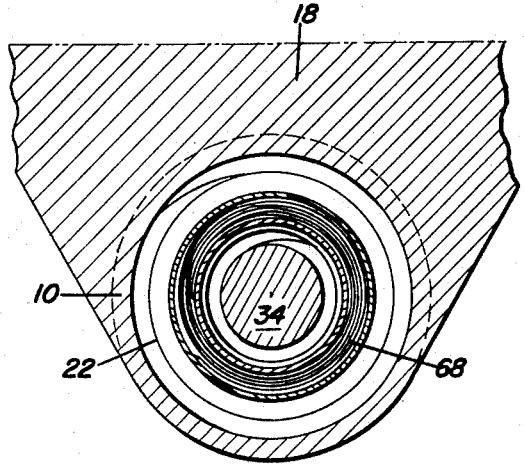
Figure 2 is a transverse sectional view generally taken along the lines 2—2 of Figure 1 wherein there is shown the details of the torsion spring feed screw and cooperating nuts.
Figure 3:
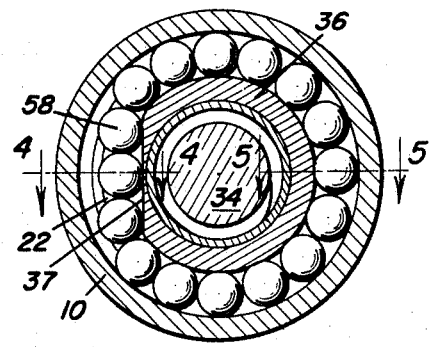
Figure 3 is an enlarged transverse detail sectional view taken substantially along the lines 3—3 of Figure 1.

Referring now to the drawing by distinguishing reference numerals it will be observed that the present mechanism consists of a cylindrical two-piece outer shell comprising sections 10 and 12. These sections 10 and 12 are provided with interior end faces 14 and 16 which embrace the upstanding legs 18 of a machine tool platen or saddle 20. The sections 10 and 12 of the two-piece outer shell are provided with an interior helical ball race 22 and 24. Section 10 of the outer shell is further provided with a longitudinally extending lug 26 projecting outwardly from the outer transverse face 28 and the complementary section 12 is similarly provided with a longitudinally extending lug 30 projecting outwardly from the outer transverse face thereof. The feed screw 34 is enclosed within the sections 10 and 12 of the two piece outer shell. Nuts 36 and 38 are disposed and complementary threaded on the feed screw 34. The nut 36 is further provided on its exterior cylindrical surface with a ball race 40 complementary to that of section 10 of the outer shell and similarly the nut 38 is provided with a ball race 42 complementary to the section 12 of the outer shell. The ball races 40 and 42 of the nuts 36 and 38 are of a recirculating type. A collar 44 is fixedly secured to nut 36 by set screw 46. The collar 44 is provided with a longitudinally projecting lug 48 projecting beyond the inner transverse surface 49 for cooperation with the stop 26 of section 10 of the outer shell. Similarly collar 50 is disposed upon nut 38 and retained by set screw 52. Collar 50 is further provided with a longitudinally extending lug 54 projecting beyond the inner transverse surface 55 thereof for cooperation with stop 30 of section 12 of the outer shell. An annular ball retainer 56 of two-piece construction is concentrically disposed over the nut 36 and retains bearing balls 58 between the helical ball race 22 in the section 10 and the ball race 40 in the outer surface of nut 36. The ball retainer 56 is further provided with a reduced clearance 60 which defines a cross-over therein. The ball retainer 56 is of such diameter as to extend beyond the center of the bearing balls 58 on its outer surface thereof and is of such configuration as to partly surround them thereby retaining them within their race for convenience in assembly and also to prevent the bearing balls 58 from coming into contact with the ribs of shell 10 at the cross-over area. The nut 36 is provided with a depressed portion 37 to facilitate passage of the bearing balls 58. It is apparent from the drawings that when the balls recede while passing through the cross-over they no longer require the same space on the plane of the outer diameter of the ball retainer 56. A complementary two-piece ball retainer 62 is concentrically disposed on nut 38 and retains another set of bearing balls 64 in position within the helical ball race 24 and the ball race 42 of the nut 38. The two-piece ball retainer 62 is likewise provided with a reduced clearance 66 defining a cross-over area of the bearing ball 64. The two-piece ball retainers 56 and 62 are secured to the nuts 36 and 38 by a light press fit or other suitable means and remain an integral part of the nuts while in operation. A torsion spring 68 is disposed between the inner ends of nuts 36 and 38 and secured thereto to exert torque on each but in opposite directions along the thread path away from the center.

In use, the present mechanism may be considered in a central position, with the two lugs 48 and 54 equidistant from their complementary stops 26 and 30. When the feed screw as illustrated, of the right hand type, is rotated to the right, the greater friction encountered in the bearing of the nuts on the feed screw 34 as compared with that of the ball assembly, causes and permits the whole inner assembly, comprising the two nuts 36 and 38, torsion spring 68 and collars 44 and 50 to rotate in unison with the feed screw 34 until lug 48 on collar 44 rests against the complementary stop 26. The thread 70 of feed screw 34 will thereby contact the complementary thread 72 of the nut 36 as illustrated in Figure 1. In this position, then, as the feed screw continues to rotate to the right, it passes through the two nuts 36 and 38 performing its duty in a conventional manner except if at any point there should be an enlargement of the feed screw 34, then nut 38 will rotate with feed screw 34 and against the tension of spring 68 sufficiently to allow said enlargement to pass through unobstructed, except for spring tension. If any portion of the feed screw 34 be of a lesser size then torsion spring 68 will automatically revolve nut 38 to the left or in the direction opposite the rotation of the feed screw, thus adjusting to a position free of slack or back lash in the mechanism. When the feed screw 34 is rotated to the left, nut 38 then becomes a load nut while nut 36 exerts pressure on the opposite side of the feed screw thread, thus automatically preventing backlash. It should here be noted that the mechanism is symmetrical, illustrating that the duties of the two nuts 36 and 38 are merely reversed, when the right hand feed screw rotates to the left, and that the mechanism operates otherwise in the same manner as above described. The nut mechanism will perform equally as well, if a left hand screw be used, providing all other working parts be reversed when necessary to correspond to the screw of the left hand type.

From the foregoing it is apparent that the successful operation and the novelty of the device depends upon what may be termed two differences, that is, the difference in thread lead as stated, and the frictional difference between the surface bearing on the screw and the anti-frictional ball bearings employed in the outer race of the device. The present mechanism does not limit in any way the amount of travel otherwise provided in a machine tool nor do the bearing balls rest upon the screw wherein they are exposed to the foreign matter that collects on said screw, but instead are contained in the outer nut arrangement where they can be protected in the same manner as is standard practice.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A backlash eliminating nut mechanism comprising a cylindrical outer shell provided with an internal ball race and having longitudinally extending lugs, a feed screw concentrically positioned within said cylindrical outer shell, nuts threaded on said feed screw and provided with an external ball race, rotatable means concentrically secured to said nuts and provided with longitudinally extending lugs projecting inwardly, means disposed in and between said internal ball race and said external bearing ball race for urging said nuts axially outwardly, bearing ball retaining means concentrically disposed on said nut, and means secured to the interior ends of said nuts to impart torque thereto in opposite directions thereof.

2. A backlash eliminating mechanism comprising a cylindrical outer shell provided with an internal helical ball race and provided with longitudinally extending lugs at the extremities thereof, a feed screw concentrically disposed within said cylindrical outer shell, nuts threaded on said feed screw and provided with an external, helical ball race, rotatable collars concentrically disposed on said nuts and provided with longitudinally extending lugs projecting axially inwardly, a plurality of bearing balls disposed within said helical ball races, a ball retainer concentrically disposed on said nuts, and a torsion spring adapted to provide torque in said nuts in opposite directions thereto.

3. A backlash eliminating nut mechanism comprising a cylindrical outer shell provided with a longitudinally extending lug on each end and having an internal helical ball race and embracing an integral portion of a platen, a feed screw positioned in concentric relation within said cylindrical outer shell, nuts threaded on said feed screw and provided with an external bearing ball race complementary to said internal helical ball race, rotatable annular collars concentrically disposed and fixedly secured to said nuts, said rotatable annular collars provided with longitudinally extending lugs projecting inwardly for cooperation with said longitudinally extending lugs on said cylindrical outer shell, a plurality of bearing balls constrained in and between said internal helical ball race of said cylindrical outer shell and said external bearing ball race of said nuts, a cylindrical bearing ball retainer concentrically disposed on said nuts in spaced relation thereon, and a torsion spring secured to the interior transverse ends of said nuts to impart torque thereto in opposite directions along the thread path of said feed screw.

4. A backlash eliminating nut mechanism comprising a two-section cylindrical outer shell provided with a longitudinally extending lug projecting from the outer extremity of each section of said cylindrical outer shell, said two-sections embracing an integral portion of a platen and each of said sections provided with an internal helical ball race, a feed screw longitudinally disposed and positioned in concentric relation in said outer shell, a pair of nuts threaded on said feed screw and provided with an external helical ball race, a pair of adjustably rotatable annular collars concentrically disposed and fixedly secured to said pair of nuts and provided with longitudinally extending lugs projecting inwardly and beyond the inner transverse surface thereof, a plurality of bearing balls constrained for movement in said internal helical ball race of said outer shell and within said external helical ball race of said pair of nuts, a pair of cylindrical bearing ball retainers concentrically disposed on said pair of nuts in spaced relation therefrom and within two sections of said cylindrical outer shell, and a torsion spring secured to the inner extremities of said pair of nuts to impart torque thereto in opposite directions along the thread path of said feed screw.

5. A backlash eliminating nut mechanism comprising a two-section cylindrical outer shell provided with a longitudinally extending lug projecting from the outer extremity of each section of said cylindrical outer shell, said two sections embracing an internal portion of a platen and each of said sections provided with an internal helical ball race, a feed screw longitudinally disposed and positioned in concentric relation within said outer shell and having the same hand as that of said internal helical ball race but of a lesser lead thereof, a pair of nuts threaded on said feed screw and provided with an external helical ball race having a return cross-over, a pair of adjustable rotatable annular collars concentrically disposed and fixedly secured to said pair of nuts and provided with longitudinally extending lugs projecting inwardly and projecting beyond the inner transverse surface thereof, a plurality of bearing balls constrained for movement within said internal helical ball race of said outer shell and within said external helical ball race of said pair of nuts, a pair of cylindrical bearing ball retainers each comprising two sections concentrically disposed on said pair of nuts in spaced relation therefrom and within said cylindrical outer shell, said two sections of said pair of cylindrical bearing ball retainers being in longitudinally spaced relation thereof, and a torsion spring secured to the inner extremities of said pair of nuts to impart torque thereto in opposite directions along the thread path of said feed screw whereby the frictional difference between the surface bearing on said feed screw and on said bearing balls provides a positive automatic take-up action.

References Cited in the file of this patent

UNITED STATES PATENTS

| | | |
|---|---|---|
| 525,780 | Boynton | Sept. 11, 1894 |
| 888,619 | Kelly | May 26, 1908 |
| 2,195,799 | Parsons | Apr. 2, 1940 |
| 2,715,341 | Hogan | Aug. 16, 1955 |
| 2,749,812 | Wetzel | June 12, 1956 |